Figure 1:
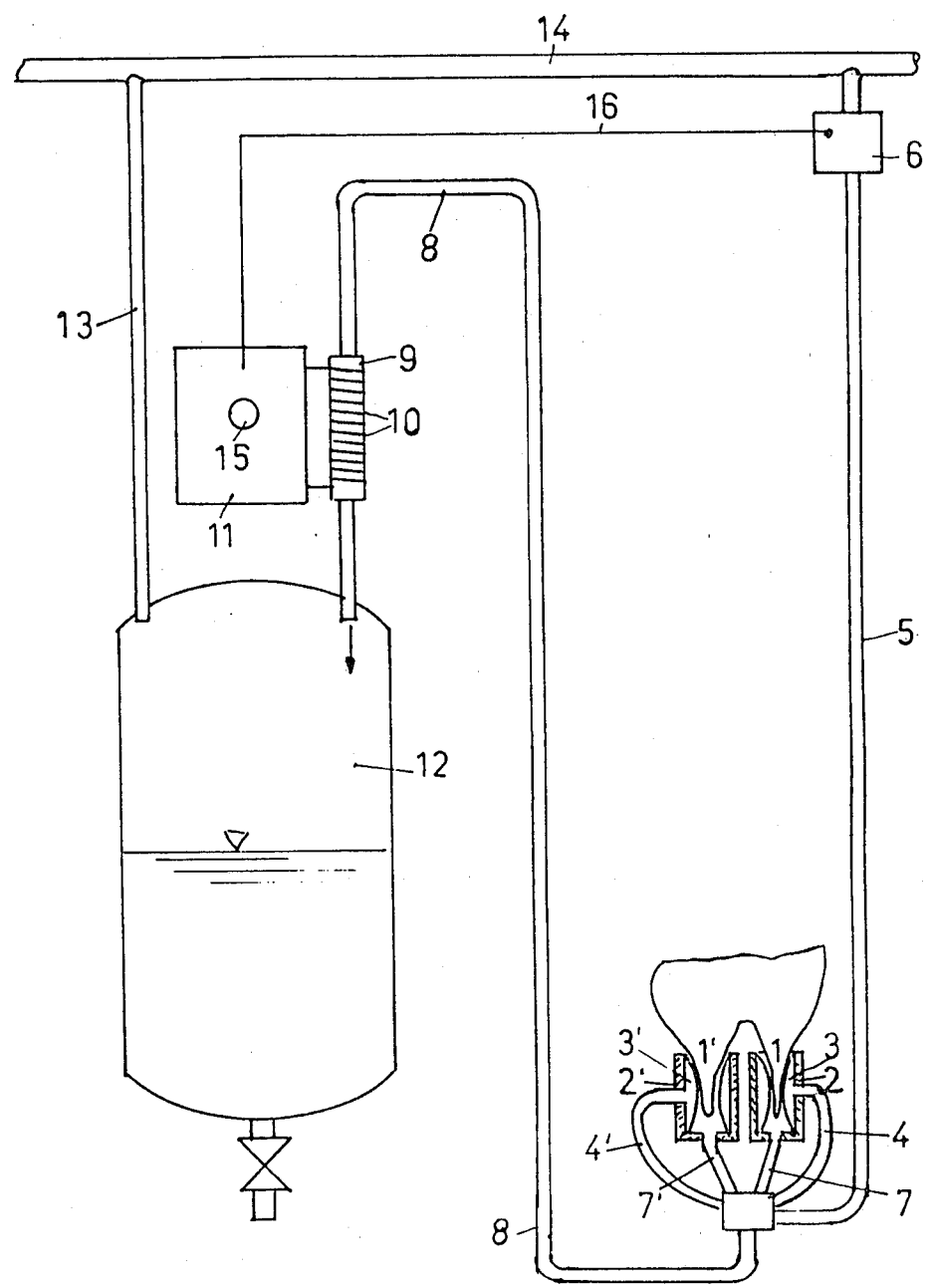

United States Patent [19]

Brayer

[11] 4,348,984
[45] Sep. 14, 1982

[54] CONTROL APPARATUS FOR MILKING MACHINES

[75] Inventor: Eyal Brayer, Kfar Monash, Israel

[73] Assignee: S.C.R. Engineers Ltd., Nathania, Israel

[21] Appl. No.: 183,988

[22] Filed: Sep. 4, 1980

[51] Int. Cl.³ ............................. A01J 7/00; A01J 5/00
[52] U.S. Cl. ................................. 119/14.08; 119/14.15
[58] Field of Search .............. 119/14.08, 14.14, 14.15, 119/14.28

[56] References Cited

U.S. PATENT DOCUMENTS

| Re. 24,420 | 1/1958 | Fielden | 324/65 R |
| 3,566,841 | 3/1971 | Gerrish et al. | 119/14.15 |
| 3,878,819 | 4/1975 | Harman | 119/14.08 |
| 4,010,715 | 3/1977 | Robar et al. | 119/14.14 |
| 4,064,838 | 12/1977 | Mukarovsky et al. | 119/14.08 |
| 4,306,517 | 12/1981 | Nakamura | 119/14.14 |

*Primary Examiner*—Gene Mancene
*Assistant Examiner*—Robert P. Swiatek
*Attorney, Agent, or Firm*—Ratner & Prestia

[57] ABSTRACT

Milk flow sensor consisting of a coil surrounding a dielectric milk flow conduit in communication with a milking teat cup and of sufficiently large dimensions to ensure pulsating milk flow therethrough, a high frequency oscillating signal input to the coil and an electronic circuit for comparing the resultant changing amplitude output signal therefrom to a reference voltage representative of minimum milk flow.

7 Claims, 2 Drawing Figures

CONTROL APPARATUS FOR MILKING MACHINES

The invention relates to the control mechanism of a milking machine, more especially to a device designed to stop the milking operation before the udder of a cow is completely emptied.

It is a well known fact that a milking machine must stop the pulsations in the teat cups as soon as the milk starts to flow out of the teats in a trickle only, a sign that the udder is empty. Further milking will cause irritation of the teat with subsequent inflammation which may lead to infection of the udder and general disease. This problem has been tackled in many ways, and nowadays all but the most primitive machines are equipped with automatic stopping devices which are monitored by the cessation of the full stream of milk from the udder to the container and its replacement by a thin trickle. The known devices are, without exception, built on the principle of a chamber containing a float, electrodes or other means for monitoring the pulsator acting on the teat cups; this chamber is positioned in the line between the teat cups and the collecting vessel and is provided in its bottom portion with an outlet nozzle of a very small diameter, and with a main outflow opening of a large diameter a few centimeters above this nozzle. As long as a full stream of milk passes through this chamber the liquid level therein is sufficiently high so that the major part of the milk leaves the chamber through its high-positioned main outflow opening, and only a small part through the narrow nozzle. The high liquid level acts on the monitoring means in a manner so as to keep the pulsator in motion. As soon as the udder is nearly empty, milk flows out in small batches and the liquid level in the chamber sinks, since now the narrow nozzle is sufficient to permit the passage of all the milk pumped out. This causes the float to sink or the electrodes to stop passing a current, whereby the pulsator operation is stopped without need to have the dairyman notice it.

Although these devices, in whatever form they may be designated, operate quite satisfactorily while new, they are soon clogged by fatty matter or mineral sediments contained in the milk and many failures have been experienced. Partial clogging will also cause wrong timing, i.e. later stopping of the pulsator than initially intended.

It is therefore the object of the present invention to do away with control equipment dependent on throttling of the milk flow by a narrow nozzle and to provide a control device designed on a free flow of the milk through a wide pipe or tube. It is another object to provide a device which will operate independently of sedimentation on the wall of this tube or pipe as well as independently of the fat contents of the milk.

Figure 2:
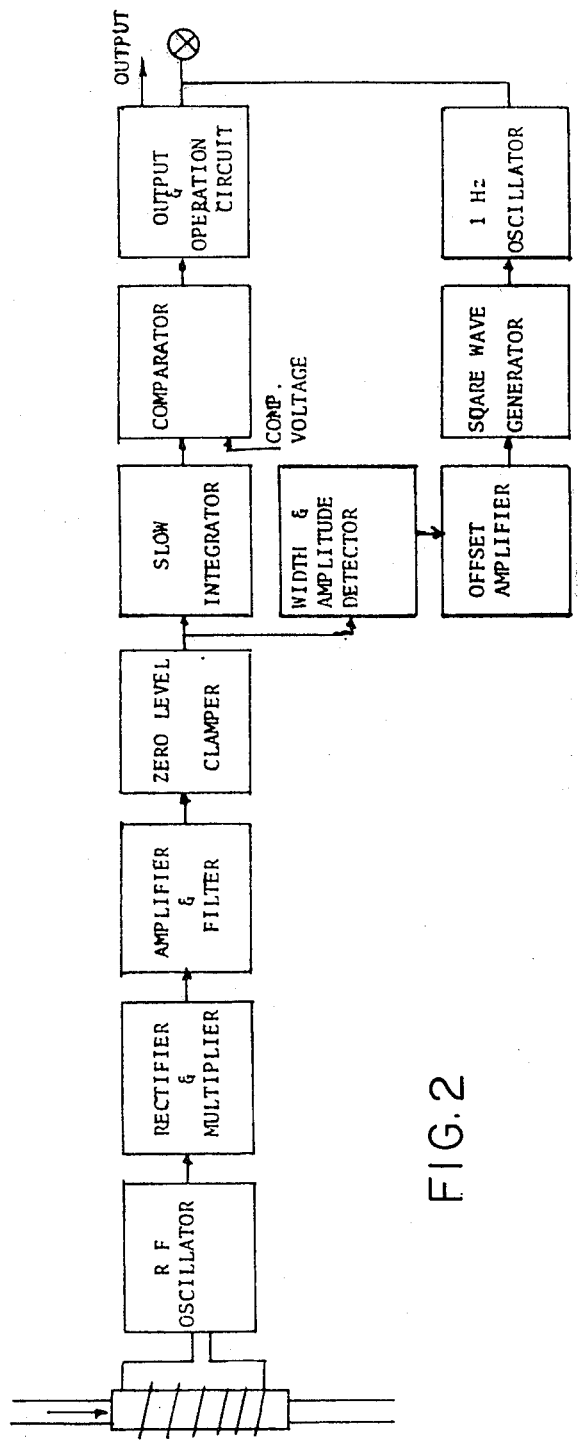

For a better understanding of the present invention, reference is made to the detailed description thereof which follows, taken in conjunction with the claims and accompanying drawings, in which:

FIG. 1 is a schematic drawing of a conventional milking apparatus, in which is incorporated the milk flow sensor of the present invention; and FIG. 2 is a block diagram of an electronic circuit utilized in the preferred form of the present invention.

Before describing the working of the control apparatus according to the invention and to enable full understanding of its design, a short description of a conventional milking machine is given in the following with the aid of FIG. 1 of the accompanying schematic drawing. Herein two teats 1, 1' of an udder (out of four) are shown, each of which has a teat cup 2, 2' attached to it by subpressure maintained in the system by a central vacuum pump (not shown). Each teat cup comprises a solid cylindrical housing and concentric therewith a cylindrical and resilient membrane which forms an annular inflatable space 3, 3' therebetween. The teat cups are connected, by means of flexible hoses 4, 4' and 5, to an electric pulsator 6 which causes pressure pulses in the annular spaces 3, 3' by alternately connecting them to a central line 14 which is kept at subpressure by the aforementioned vacuum pump, and to the atmosphere; hereby the membranes are alternately pressed against the teat and released, the inner space of the teat cup being kept permanently at sub-pressure through the milk lines 7, 7' and 12, and through a closed milk collector vessel 8 connected to the central line 14 by a line 13. The action simulates manual milking whereby the milk flows out of the udder through the teats into the teat cups and is sucked out from these through the milk lines into the collector vessel 12. The pulsator is usually built to connect simultaneously all four teats to the sub-pressure and then to the atmosphere, or it actuates alternately two cups on and two cups off. Suitable milking pulses vary from 25 to 120 per minute, a common average being 60 pulses per minute which would—in a 2/2 arrangement—pump 120 portions per minute. A control apparatus (11) according to the invention is shown to be inserted into the milk line; this will be described further on.

The milk travels through the milk line in portions at a rate determined by the pulsator frequency, interrupted by zero supply intervals. A maximum rate of 66 cm$^3$/s would be an excellent yield for a cow. This maximum volume drops gradually to a minimum of 4.75 cm$^3$/s when the milking process should be stopped to avoid damage to the udder.

These pulsating flow conditions are utilized in the control device according to the invention, by comparing the pulse intensity of the minimum portion—at which the pulsator is required to stop operating—with the pulse intensity during normal milking operation. The control device consists of a tube 9 of a non-conductive material such as glass or a plastic material which is inserted into the piping conducting milk from the teat cups to a container and is surrounded by coil windings 10 of an insulated wire. A R-F oscillator connected to the coil terminals applies thereto a voltage of high frequency. The milk flowing in pulses through the tube and the coil interior causes a pulsating change of conductivity therein, which results in a varying coil induction and an output wave of changing amplitude as a function of the milk portions passing through.

This signal is passed through an electronic analysing system and is compared with a standard pre-selected voltage which corresponds to the permissible minimum milk flow. As soon as this minimum value is reached an output signal stops the pulsator 6 through an electric line 16 and produces a warning light 15.

FIG. 2 illustrates a block diagram of an electronic circuit which can be usefully employed in connection with the tube and coil of the milking machine, but it will be understood that similar results can be obtained by a system of another combination of electronic units. The figure shows the connection of the coil terminals to a high-frequency oscillator; the signal issuing as a function of the varying conductivity of the inner coil space is analyzed in the circuit and compared with the predetermined minimum output. As soon as this minimum is reached, a signal shuts off the pulsator and lights the warning lamp 15, which may give a steady or a flickering light to draw the attention of the personnel to it. The same effect is obtained should the cow remove one or more of the teat cups, whereby milk delivery is stopped.

The dimensions of the tube and coil as well as the frequency may vary over a large range, but an apparatus built to the following dimensions has proved itself satisfactory in all respects: The tube was made of "Perspex" and had an inner diameter of 16 mm and a length of 250 mm. The coil wound around the outer tube diameter of 19.8 mm had a length of 100 mm, about 90 windings of a 0.67 mm wire. The oscillator frequency was 5 MHz.

Nevertheless, taking into account available space and electric conditions, it is proposed that the coil may have as little as 4 windings and a length of 5 mm or as many as 1000 windings at a length of 200 mm, while the frequency may vary between 250 kHz and 20 MHz. The minimum diameter of the tube may be 8 mm and the maximum 40 mm. The pulsator frequency may likewise vary between 25 and 120 milking pulses per minute.

Any non-conducting material that is not detrimental to milk may be used in the manufacture of the tube such as e.g. glass, provided it is wide enough to have the milk portions separated from each other, a continuous flow giving no signal at all.

I claim:

1. A control apparatus for a milking machine which latter is provided with teat cups operated by an electric pulsator, a milk collecting vessel kept at sub-pressure, a pipeline therebetween through which all of the milk from said teat cups flows to said vessel, comprising in combination a tube of a non-conductive material inserted into the pipe line connecting said teat cups to said milk collecting vessel, said pipe line and said tube being of sufficiently wide dimensions to carry the milk as pulses of milk flowing in separated portions passing through said line and said tube at the rate of the pulsator pulses, a coil of wire windings surrounding said tube on its outside, an electronic system including means for applying a high-frequency voltage to said coil, means for detecting the varying amplitude high frequency output signal from said coil indicative of the varying conductivity of the coil interior space due to the milk passing therethrough in pulses, and means for comparing said output signal with a predetermined voltage corresponding to a permissible minimum flow of milk, the system being adapted to interrupt the operation of said electric pulsator, as soon as the output signal reaches the value of said predetermined voltage.

2. A control apparatus as defined in claim 1, provided with a signal lamp which is adapted to light up upon interruption of the pulsator operation.

3. A control apparatus as defined in claim 1, comprising a tube made of glass.

4. A control apparatus as defined in claim 1, comprising a tube made of a plastic material.

5. A control apparatus as defined in claim 1, wherein the frequency used is approximately 5 mHz.

6. A control apparatus as defined in claim 5, wherein the coil comprises approximately 90 windings of a 0.67 mm wire, has a length of 100 mm and an inner diameter of 19.8 mm.

7. A control apparatus as defined in claim 1, wherein the frequency used is in the range 250 kHz-20 mHz.

* * * * *